Oct. 27, 1942.  H. NICHOLSON  2,300,004
AIRCRAFT PILOT TRAINING DEVICE
Filed March 23, 1942
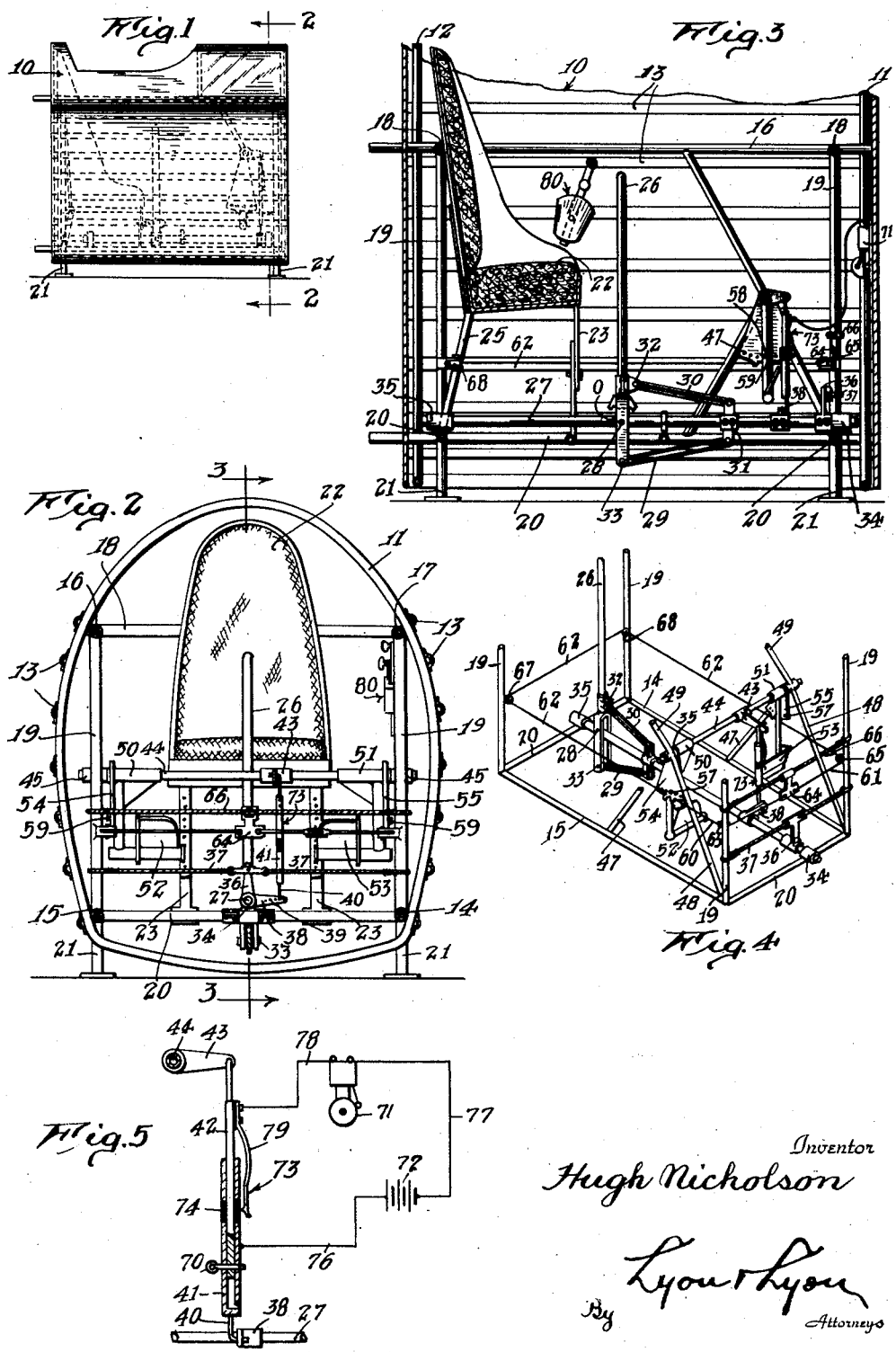

Patented Oct. 27, 1942

2,300,004

UNITED STATES PATENT OFFICE 2,300,004

AIRCRAFT PILOT TRAINING DEVICE

Hugh Nicholson, Oxnard, Calif., assignor to Aircraft Industries Co., Glendale, Calif., a partnership firm Application March 23, 1942, Serial No. 435,815

7 Claims. (Cl. 35—12)

This invention relates to ground devices for training airplane pilots and developing proper habits in manipulating the controls of an airplane.

An object of the invention is to provide a relatively simple and inexpensive machine for training a student pilot to properly coordinate the manipulation of the stick and pedals of an airplane so as to properly bank the airplane while making a turn.

Another object is to provide a machine for indicating a lack of proper coordination between the pedal and stick movements of the student.

Other more specific objects and features of the invention will become apparent from the detailed description to follow of a particular embodiment of the invention.

The customary control mechanism for some types of airplanes includes a rudder bar or foot pedals actuated by the feet of the pilot for steering, and a control stick positioned between the extended legs of the pilot for controlling the banking ailerons and the elevators. The arrangement is such that swinging the stick to the left elevates the right wing, thereby banking the plane for a left turn, and swinging the stick to the right banks the plane in the opposite direction for a right turn. It is important that the extent of lateral movement of the stick be accurately determined when making a turn. If the plane is banked insufficiently, it will side slip out of the turn, and if banked excessively it will sideslip in the direction of the turn. Some pilot students find it exceedingly difficult to learn the proper relative movements of the rudder pedals and the control stick, and the present invention is particularly useful in training such students.

Briefly, the present invention comprises a stationary machine having a pilot seat, rudder pedals, and a control stick, all positioned to simulate the corresponding elements of an actual airplane.

Provision is made for positively linking the control stick and rudder pedals together to force the proper movement of each in response to movement of the other so that as the student practices the manipulation of the rudder he is forced to move the control stick simultaneously in the proper direction and to the proper extent. The machine is also adjustable so that the rudder pedals and the control stick can be moved independently of each other, but if they are not moved in proper coordination a signal will be given to warn the student.

In the drawing:

Fig. 1 is a side elevation of one embodiment of the invention;

Fig. 2 is a vertical, cross section, taken in the plane II—II of Fig. 1;

Fig. 3 is a longitudinal vertical section, taken in the plane III—III of Fig. 2;

Fig. 4 is a skeleton, perspective view, showing the essential movable elements of the machine; and Fig. 5 is a schematic diagram of the electrical circuit of the device.

Referring to Fig. 1, the present device comprises an outer casing 10 shaped to simulate that portion of the fuselage of an airplane containing the cockpit, the lateral walls of the casing being curved to conform to the usual curvature of an airplane, and the front and rear walls corresponding to cross-bulkheads that might be formed in an airplane to define the ends of the cockpit.

The casing 10 may be supported on a framework of any suitable design, but in the construction shown in the drawing the frame includes circumferential tubular members 11 and 12 on which the lateral wall or skin is supported through longitudinal members 13. The members 11 and 12 are in turn connected to four longitudinal tubular members 14, 15, 16 and 17 which in turn are connected at their opposite ends to upper transverse members 18, vertical side members 19, and transverse bottom members 20. The longitudinal bottom members 14 and 15 may be supported on suitable legs 21 extending to a floor.

A seat 22 is positioned just in front of the rear wall of the cockpit and is supported by a pair of adjustable front legs 23 extending down to one of the transverse frame members 20, and by a pair of adjustable rear legs 25 which extend down to the rear cross member 20.

Positioned immediately in front of the seat 22 is a control stick 26 which is supported for universal movement about a pivot point O. Thus at the pivot point O the control stick 26 is bifurcated to straddle a longitudinal tubular shaft 27, and is pivotally secured to the shaft by a pin 28 for fore and aft swinging movement with respect thereto. Such movement of the stick is yieldably resisted by elastic elements 29 and 30 stretched between an anchor clamp 31 on the shaft 27 and two points 32 and 33 on the stick 26 positioned, respectively, above and below the pivot point O. However, such movement of the stick does not actuate any other portion of the mechanism.

Lateral movement of the stick 26 rotates the shaft 27, such rotation being possible by virtue of the fact that the shaft is journaled at its front and rear ends in bearings 34 and 35, respectively, supported on two of the bottom cross members 20.

The shaft 27 (Fig. 2) has clamped thereto, near its forward end, a vertically extending arm 36, to the upper end of which are secured a pair of outwardly extending elastic ropes 37 secured at their outer ends to opposite ones of the vertical frame members 19; they yieldably retain the shaft in neutral position in which the stick 26 is vertical.

Also clamped to the shaft 27, a short distance rearwardly of the arm 36, is an arm 38 having a plurality of longitudinally spaced holes 39, any one of which is adapted to receive the rearwardly bent end of a link rod 40. The upper end of this link rod 40 connects to the lower end of a sleeve 41 which is in telescoping relation with the lower end of a rod 42, the latter being linked to rudder pedals in the machine.

Thus the rod 42 is pivotally connected at its upper end to an arm 43 secured to a transverse hollow shaft 44 which is journaled at its outer ends in bearings 45, the bearings being supported by angularly extending frame members 47, 48 and 49 anchored at their outer ends to different ones of the four longitudinal frame members 14, 15, 16 and 17.

Rotatably mounted on the transverse shaft 44, just inside the supporting bearings 45 therefor, are a pair of pedal arms 50 and 51, respectively, which pedal arms have secured to their lower ends pedals 52 and 53, respectively, adjustable to receive and support the feet of a student in the seat. There are positioned on the cross shaft 44 just outside of the pedal arms 50 and 51 a pair of sector plates 54 and 55, each having a plurality of holes 57 arranged in an arc adapted to register with a hole 58 in the adjacent pedal arm 50 or 51 so that each pedal can be locked to its adjacent sector plate 54 or 55 by a pin 59 in any one of a plurality of different angular positions. This permits adjustment of the pedals 52 and 53 to fit students of different leg lengths.

The right sector plate 54 is anchored to the cross shaft 44 for movement therewith but the left sector plate 55 is rotatable on the cross shaft. This is necessary because the two sector plates 54 and 55 are so coupled by mechanism next to be described that they must move in opposite directions, the same as the steering pedals in actual airplanes.

The mechanism for intercoupling the two sector plates is more clearly shown in Fig. 4 and comprises three nonextensible cables 60, 61 and 62 interconnecting the plates. The cable 60 extends forwardly from the sector plate 54 to a pulley 63 secured to the adjacent front corner post 19, thence laterally to a point substantially midway of the machine, where it connects to a connector 64. The cable 61 similarly extends from the connector 64 around a pulley 65 and back to the sector plate 55. The connector 64 is secured to the midpoint of an elastic rope 66 extending between the two front posts 19, 19 and serves to yieldably maintain the connector 64 in neutral position. The cable 62 is connected at one end to the segment 54, from which it extends rearwardly, and around a pulley 67 on the rear right post 19; thence laterally across the machine and around a pulley 68 secured to the left rear post 19, and thence forwardly to the sector plate 55. It will be apparent that since the cables 60, 61 and 62 are nonextensible, movement of either of the sector plates in one direction causes corresponding reverse movement of the other sector plate, and both sectors are yieldably retained in neutral position by the elastic rope 66.

Since the right sector plate 54 is anchored to the cross shaft 44 for movement therewith, depression by the student of the right pedal 52 elevates the rod 42. Depression of the right pedal turns an airplane to the right, and the control stick 26 should be simultaneously swung to the right to bank the airplane for the turn. It will be observed that when the stick 26 is swung to the right, it elevates the sleeve 41. Furthermore, the relative length of the arms 38 and 43 are so chosen that when the movement of the control stick is of a magnitude to properly bank the airplane for the turn resulting from a given depression of one of the rudder pedals, the rod 42 and the sleeve 41 move not only in the same direction but to the same extent. Hence the control stick can be forced to move to the proper extent for any given movement of the rudder pedal by locking the sleeve 41 and rod 42 together. Such interlocking of the parts can be effected by inserting a pin 70 through holes in the rod 42 and the sleeve 41, respectively, which register with each other when the pedals and control stick are both in neutral position.

In using the device, it is often desirable to have a student practice in the machine for a considerable period of time with the pin 70 locking the stick and rudder mechanisms for proper synchronized movement, so that, as the student practices rolling in and out of turns, the mechanical linkage forces the proper coordination of the hands and feet. Usually, after a few hours of such practice, the student's habits are sufficiently formed so that the pin 70 can be removed, permitting the rudder pedals and the stick to take any position imparted thereto by the student.

However, an important feature of the machine is that it provides a signal indicating the proficiency of the student in properly coordinating the stick and rudder movements when the pin 70 is removed. This signaling means includes an electric bell 71 adapted to be energized from a current source 72 through a switch mechanism 73 actuated by the sleeve 41 and rod 42. Thus there is mounted on the sleeve 41 a contact structure consisting of an annular band 74 of insulating material surmounted at opposite ends by annular conducting rings in electrical contact with the sleeve 41, which, in turn, is connected by a flexible lead 76 to one terminal of the current source 72. The other terminal of the current source 72 is connected by a lead 77 to one terminal of the electric bell 71. The other terminal of the electric bell is connected by a flexible lead 78 to a contact spring 79 which is insulatingly supported at one end on the rod 42 and has a free end bearing against the switch element on the sleeve 41.

When the rod 42 and sleeve 41 are in proper relative positions, the free end of the contact spring 79 rests against the midportion of the band 74, and the circuit for energizing the bell 71 is open. So long as the student maintains proper coordination between his hand and feet movements, the spring 79 will remain on the insulating band 74, but if the student moves the stick 26 too little or too much for a corresponding movement of the rudder pedals, the spring 79 will ride off the insulation ring 74 onto one or the other of the conducting rings 75, thereby completing the circuit for ringing the bell 71.

If it is found that the student has poor coordination, as indicated by frequent ringing of the bell 71, then his habits can be improved by again interlocking the rod 42 to the sleeve 41 with the pin 70 and continuing the practice of rolling into and out of turns.

In order to simulate more closely the conditions in an actual airplane, an engine throttle and mixture control unit 80 may be provided at the left of the seat 22 for actuation by the left hand of the pilot while he actuates the stick 26 with the right hand. However, the control 80 is merely a dummy control similar to standard controls on airplanes and its detailed structure is of no significance in connection with the present invention.

It has been found that the machine has been highly successful in developing the ability of students to coordinate their hand and feet movements, and in actual use some students that would have been "washed out" as flyers because of lack of coordination, have been saved by means of the machine of this invention. In explanation of this statement, it is a recognized fact that proper coordination of stick and rudder pressures seems to be unnatural for some individuals, and it was found impossible to develop in them the proper habits without practice in the present machine.

For the purpose of explaining the invention one particular embodiment thereof has been described in substantial detail. However, it will be understood that various changes from the particular construction shown can be made without departing from the invention, which is to be limited only to the extent set forth in the appended claims.

I claim:

1. An aircraft pilot training machine comprising two rudder pedals movable in simulation of the steering movement of the rudder pedals of an airplane, a manually operable control stick movable to simulate the movements of the control stick of an airplane for banking the airplane, and means directly interconnecting said pedals and control stick for forcing correlated movement of each in response to movement of the other.

2. An aircraft pilot training machine comprising two rudder pedals movable in simulation of the steering movement of the rudder pedals of an airplane, a manually operable control stick movable to simulate the movements of the control stick of an airplane for banking the airplane, and means for detachably interconnecting said pedals and stick for forcing correlated movement of each with respect to the other.

3. A machine as described in claim 2, including a pair of movably mounted elements movable in the same direction in closely positioned parallel paths, means connecting one of said elements to said rudder pedals for movement of said one element to a predetermined extent in response to a given rudder movement, means connecting the other of said elements to said control stick for movement equal in extent to the movement of said one element in response to the proper control stick movment for said rudder movement, and means for detachably interlocking said two elements for forcing them to move together.

4. A machine as described in claim 2, in which the means for interconnecting said rudder pedals and said control stick comprises a pair of telescopically slidable members, one secured to the rudder pedals for positive movement therewith, and the other secured to said stick for positive movement therewith, and means for detachably locking said elements together in predetermined relative position for forcing coordinated movement of said stick with respect to movements of said rudder pedals.

5. An aircraft pilot training machine comprising rudder pedals movable in simulation of the steering movement of the rudder pedals of an airplane, a manually operable control stick movable to simulate the banking movements of the control stick of an airplane for banking the airplane in flight, and means for producing a single signal indicating whether said stick and rudder are moved in correlated relation to properly bank an airplane while making a turn during flight, said means including a pair of control elements each independently movable with respect to the other, a direct controlling connection between said rudder pedals and one of said elements, a direct controlling connection between said control stick and the other of said elements, and signalling means automatically responsive to relative movement between said two elements, the extent and direction of movements of said two control elements with respect to the movements of said control stick and of said rudder pedals, respectively, being such that both control elements move together as a unit when said stick is moved in said predetermined correlated relation with respect to said rudder pedals.

6. An aircraft pilot training machine comprising rudder pedals movable in simulation of the steering movement of the rudder pedals of an airplane, a manually operable control stick movable to simulate the movements of the control stick of an airplane for banking the air plane, means for indicating whether said stick is moved in a predetermined correlated relation with respect to said rudder pedals, comprising a pair of cooperating independently movable electrical contact members, an electrical signaling means responsive to predetermined relative movements of said contact members, means for positively moving one of said contact members in response to movement of said rudder pedals, and means for positively moving the other contact member in response to movement of said stick, the extent and direction of movement of said contact members with respect to the movements of said control stick and rudder pedals, respectively, being such that both contact members move together as a unit when said stick is moved in said predetermined correlated relation with respect to said rudder pedals.

7. An aircraft pilot training machine comprising rudder pedals movable in simulation of the steering movement of the rudder pedals of an airplane, a manually operable control stick movable to simulate the movements of the control stick of an airplane for banking the air plane, a pair of independently movable elements movable through adjacent parallel paths, means directly connecting one of said elements to said rudder pedals for movement in response to movement of the rudder pedals, means directly connecting the other of said elements to said stick for movement in the same direction and to the same extent as said one element in response to properly correlated movement of said control stick with respect to said rudder pedals, means for detachably interlocking said two elements for identical movement, and means for signaling a departure from identical movements of said elements.

HUGH NICHOLSON,